April 25, 1961  W. K. WESTMIJZE  2,981,871

PERMANENT MAGNET

Filed Aug. 19, 1957

INVENTOR
WILLEM KLAAS WESTMIJZE

BY
*Frank R. Trifari*
AGENT

United States Patent Office 2,981,871
Patented Apr. 25, 1961

2,981,871
PERMANENT MAGNET

Willem Klaas Westmijze, Eindhoven, Netherlands, assignor to North American Philips Company, Inc., New York, N.Y., a corporation of Delaware Filed Aug. 19, 1957, Ser. No. 678,956

Claims priority, application Netherlands Sept. 19, 1956

5 Claims. (Cl. 317—201)

The invention relates to a permanent magnet having magnetic poles of opposite polarities lying on either side of a datum line. Such permanent magnets may be used, particularly if a large number of poles of alternately opposite polarities are provided, for example in magnetic filters, claw plates, lifting devices and the like, in which the datum line will, as a rule, be a straight line, and for example in magnetic clutches or as rotors in electric machines, in which the datum line will, as a rule, be a circle.

In accordance with the invention the direction of magnetization between two poles of opposite polarities is at angles to the datum line which vary continuously in the same direction as a function of this line.

This provides the advantage that on one side of the datum line the field intensity is higher at the expense of the field intensity on the other side of the line, than without the said variations in magnetization direction. In a particular case it may even occur that the field intensity on one side of the line is substantially zero and that on the other side it has double the value.

According to a further aspect of the invention the magnetization has an at least substantially constant value.

The invention will be described with reference to the accompanying drawing in which.

Figure 1:
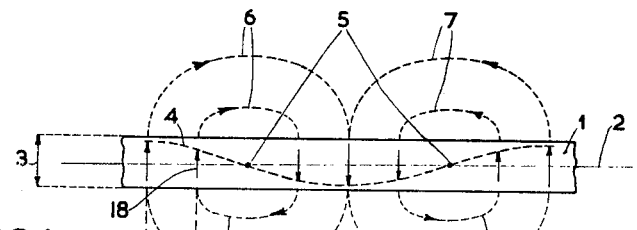
Fig. 1 is a diagrammatic view of a body sinusoidally magnetized transverse to its longitudinal axis.

Referring to Fig. 1 part of a magnet is designated by 1 and the datum line is designated by 2. The magnet 1 may be rectangular or form part of a disc, having a thickness 3. In the first case the line 2 is straight, in the latter case it forms part of a circle.

The magnet is magnetized in a sinusoidal, transverse manner with poles of alternating polarities. The magnetization direction is indicated by the arrows; the peaks of the arrows indicate, for example, the north poles and the other ends of the arrows indicate the south poles. The sinusoidal form of the magnetization is indicated by the broken line 4, the intensity of the magnetization varying in the direction of length of the arrows. The points, where the magnetization is equal to zero, are indicated by 5. Such a magnet will exhibit, on either side of the line 2, magnetic fields such as indicated by 6, 7, 8 and 9, the field variation between a north pole and a south pole being indicated by the peaks of the arrows. On either side of the line 2 these fields have substantially equal intensities.

Figure 2:
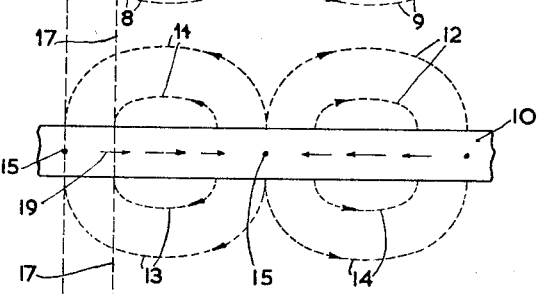
Fig. 2 is a diagrammatic representation of a body sinusoidally magnetized in its longitudinal direction.

Referring to Fig. 2, part of a further magnet 10 is also magnetized sinusoidally, which is indicated by arrows of different lengths, the magnetization being, however, in a longitudinal direction. The magnetic fields are designated by 11, 12, 13 and 14 and the direction is indicated by the peaks of the arrows. The points where the magnetization is equal to zero are indicated by 15.

Figure 3:
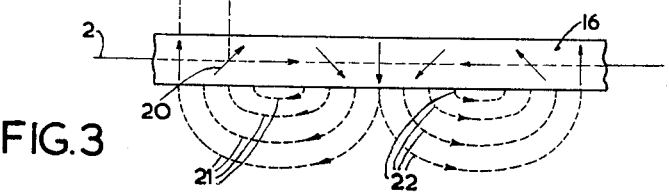
Fig. 3 is a diagrammatic representation of a body sinusoidally magnetized in both a direction transverse to, and in, its longitudinal direction.
Figure 4:
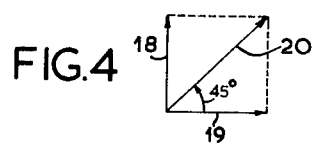
Fig. 4 is a vector diagram of the fields in a body magnetized in both the longitudinal direction and a direction transverse thereto.

If it is assumed that the magnets 1 and 10 are combined to form a single magnet of the same size as the magnet 1, the magnet 16 shown in Fig. 3 is obtained in accordance with the invention. Since the magnetization at the extreme left-hand point 15 of the magnet 10 is equal to zero, the magnetization at the corresponding point of the magnet 16 will be equal to that at the corresponding point of the magnet 1, i.e. equal to the extreme left-hand arrow of the magnet 1. At the next-following point, indicated by the broken line 17, the magnetization is determined by combining the vertical arrow 18 of the magnet 1 and the horizontal arrow 19 of the magnet 10. Owing to the sinusoidal variation of the arrows, the arrows 18 and 19 have a length equal to $\frac{1}{2}\sqrt{2}$, as compared with the large arrows. In Fig. 4 the arrows 18 and 19 are combined, the resultant 20 having consequently the same length as the large arrows, so that the magnetization in the magnet 16 of Fig. 3 at the said point is equal to that at the preceding point, it being however, turned through an angle of 45° to the right as is indicated by the arrow 20.

Going from point to point a magnetization is obtained in the magnet 16 as is indicated by the arrows.

Since the magnetic fields 6 of the magnet 1 and 11 of the magnet 10 have opposite directions, they will compensate one another. The same applies to the fields 7 and 12. It follows therefrom that on the upper side of the magnet 16 of Fig. 3, over the line 2, no magnetic fields prevail.

The magnetic field 8 of Fig. 1 and the field 13 of Fig. 2 are, on the contrary, added, since they have the same directions. The same applies to the fields 9 and 14. The fields 21 and 22 on the other side of the magnet 16 of Fig. 3 have, consequently, double the intensity of the fields 8 or 13, which is indicated diagrammatically by double the number of lines of force.

The magnet 16 according to the invention is therefore very advantageous in those cases in which the magnet need produce a field only on one side.

Figure 5:
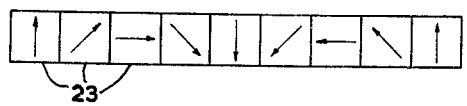
Fig. 5 is a composite body built up of a plurality of bodies each magnetized in both the transverse and longitudinal directions.

The magnet 16 may be obtained by means of a plurality of small magnets 23 of Fig. 5, which are previously magnetized each as indicated by the arrows and which are assembled together by clamping means.

It will be obvious that, if the magnetude and/or the direction of the magnetization deviate slightly from those indicated in Figs. 3 and 5, the field on the upper side of the magnet will not be exactly equal to zero and that the field on the lower side (21, 22) will be correspondingly weaker, but even in this case the advantage obtained is appreciable.

The magnet is preferably made of a material, of which the ferromagnetic properties are mainly determined by compounds or mixed crystals of compounds having a magneto-plumbite structure, the composition being $MO.6Fe_2O_3$, wherein M designates one of the metals Pb, Ba or Sr and, if necessary, Ca, since this material is not demagnetized. Suitable materials are described in United States Patent No. 2,762,777.

What is claimed is:

1. A permanent magnet comprising a body having a plurality of magnetic poles of opposite polarity on either side of a line extending in a given direction through said body, poles of opposite polarity on either side of said line having between them a direction of magnetization forming an angle with said line, the angle formed by the direction of magnetization between adjacent pairs of poles of opposite polarity on either side of said line varying continuously along said line in said given direction.

2. A permanent magnet as claimed in claim 1 in which the magnetization has an at least substantially constant value.

3. A permanent magnet as claimed in claim 1 in which the angles vary between adjacent pairs of poles of opposite polarity on either side of the line by at least about 45°.

4. A permanent magnet as claimed in claim 1 in which the magnet is constituted of a plurality of small magnets, the magnetization direction in adjacent magnets forming angles with said line which vary continuously in said given direction.

5. A permanent magnet as claimed in claim 1 in which the body consists essentially of a material having a composition $MO.6Fe_2O_3$, wherein M is at least one metal selected from the group consisting of Ba, Sr, and Pb.

References Cited in the file of this patent

UNITED STATES PATENTS

| | | |
|---|---|---|
| 2,722,617 | Cluwen et al. | Nov. 1, 1955 |
| 2,825,840 | Iskenderian | Mar. 4, 1958 |
| 2,830,207 | Clark | Apr. 8, 1958 |

FOREIGN PATENTS

| | | |
|---|---|---|
| 453,899 | Canada | Jan. 4, 1949 |
| 673,649 | Great Britain | June 11, 1952 |